(12) United States Patent
Hassidim et al.

(10) Patent No.: US 9,391,920 B2
(45) Date of Patent: Jul. 12, 2016

(54) ITERATIVE MAX-MIN FAIRNESS ALGORITHMS

(75) Inventors: Avinatan Hassidim, Petah Tikva (IL); Emilie Jeanne Anne Danna, Mountain View, CA (US); Alok Kumar, Fremont, CA (US); Dan Raz, Timrat (IL); Michal Segalov, Tel Aviv (IL)

(73) Assignee: Google Inc., Mountain View, CA (US)

( * ) Notice: Subject to any disclaimer, the term of this patent is extended or adjusted under 35 U.S.C. 154(b) by 812 days.

(21) Appl. No.: 13/599,958

(22) Filed: Aug. 30, 2012

(65) Prior Publication Data
US 2013/0121146 A1 May 16, 2013

(30) Foreign Application Priority Data
Nov. 10, 2011 (IL) .......................................... 216313

(51) Int. Cl.
| H04L 12/911 | (2013.01) |
|---|---|
| H04L 12/923 | (2013.01) |
| H04L 12/927 | (2013.01) |
| H04L 12/24 | (2006.01) |
| H04L 12/801 | (2013.01) |
| H04W 72/02 | (2009.01) |
| H04W 72/06 | (2009.01) |

(52) U.S. Cl.
CPC ............ *H04L 47/781* (2013.01); *H04L 47/762* (2013.01); *H04L 47/805* (2013.01)

(58) Field of Classification Search
CPC ......... H04L 47/10; H04L 47/29; H04L 47/30; H04L 45/125; H04L 45/30
See application file for complete search history.

(56) References Cited

U.S. PATENT DOCUMENTS

| 6,023,733 A | 2/2000 | Periasamy et al. | |
|---|---|---|---|
| 6,981,055 B1 | 12/2005 | Ahuja et al. | |
| 2003/0072327 A1* | 4/2003 | Fodor et al. .................... | 370/468 |
| 2003/0163593 A1* | 8/2003 | Knightly ........................ | 709/251 |
| 2004/0196790 A1* | 10/2004 | Balakrishnan et al. ........ | 370/232 |
| 2005/0007949 A1 | 1/2005 | Okura | |
| 2011/0013572 A1* | 1/2011 | Huang et al. ................... | 370/329 |

* cited by examiner

*Primary Examiner* — Un C Cho
*Assistant Examiner* — Peian Lou
(74) *Attorney, Agent, or Firm* — John D. Lanza; Foley & Lardner LLP (57) ABSTRACT

Systems and methods are provided for allocating resources of a network among a plurality of traffic demands to optimize fairness and network utilization. Methods based on flow-increase dynamics converge toward an upward max-min fair (UMMF) allocation, in which the value of each traffic demand cannot be increased, along any of its paths, even if larger traffic demands are removed from the network. An efficient iterative algorithm that converges to a UMMF solution is also provided. The described methods and systems can be implemented efficiently, distributively, and asynchronously.

8 Claims, 8 Drawing Sheets

ITERATIVE MAX-MIN FAIRNESS ALGORITHMS

CROSS REFERENCE TO RELATED APPLICATION

This application claims priority to Israel Patent Application No. 216313, filed Nov. 10, 2011, entitled "Method for Allocating Resources of a Network Among a Plurality of Traffic Demands and a Network Using Such Method", hereby incorporated by reference in its entirety.

BACKGROUND

1. Field of the Disclosure

The present disclosure relates generally to network communication, and more specifically, to traffic engineering in networking systems.

2. Description of the Related Art

In a communication network, users establish connections between a source node and a destination node via a flow of data that is transferred through the network over one or more network paths. The data of one or more connections constitutes traffic over the network. A traffic demand in the network between the source node and the destination node is represented by a commodity. A network path for a commodity between the source and destination nodes is defined by a set of nodes (the source-destination node pair and any intermediate nodes) interconnected by a set of links coupled to the nodes carrying the data flow of the commodity. Each node and each link has a capacity corresponding to the traffic it may carry.

The allocation of global shared resources to different users of a network is a fundamental problem in distributed computing and networking. A well accepted principle is that network resources, such as network capacity, belong to all users and thus should be shared among the users in a fair and non-discriminatory way. However, it is important to optimize fairness with throughput, to ensure that resources of the network are utilized as much as possible.

In one known fair allocation strategy, known as max-min fairness, resources are allocated in order of increasing demands—broadly speaking, low-traffic commodities are given all the capacity they want, while high-traffic commodities evenly split the remaining capacity of the network. More specifically, the max-min fairness strategy first maximizes the smallest allocation among all commodities; it then maximizes the second smallest allocation subject to the first maximized smallest allocation, and so on. An allocation is max-min fair if in order to increase the flow allocated to a commodity, a flow allocated to a commodity with an equal or less flow would have to be decreased.

In the restricted case where each commodity has a single path connecting its source to its destination, the min-max fairness allocation may be determined using the known WaterFill algorithm, which progressively fills the demands of commodities at the same rate until capacities of the network links are saturated. In the more general and realistic case where each commodity can be sent along multiple paths connecting its source to its destination, the standard approach for finding the max-min fairness allocation requires an iterative solution of multiple linear programs. Such an approach has several limitations. First, it scales badly with the size of the network, the number of demands, and the number of paths. Second, it provides the network operator limited control and understanding of the inner working of the allocation scheme. Third, it is inherently centralized and may not be implemented in a distributed manner. Fourth, it may be unstable because a minor change in the capacity of the network or traffic demands may have a significant effect on the determined allocation.

SUMMARY

One aspect is directed to a method for allocating resources of a network among a plurality of traffic demands. The method includes selecting a first traffic demand from the plurality of traffic demands, where the first traffic demand has a first total flow value along one or more first paths in the network. The method further includes identifying, from the plurality of traffic demands, a second traffic demand having a second total flow value along one or more second paths in the network, where the second total flow value is higher than the first total flow value. The method further includes increasing, using routing circuitry associated with the first traffic demand, the first total flow value of the first traffic demand along at least one of said one or more first paths and decreasing, using routing circuitry associated with the first traffic demand, the second total flow value of the second traffic demand along at least one of said one or more second paths. The increased first flow value of the first traffic demand is upper bounded by the decreased second total flow value of the second traffic demand.

Yet another aspect is directed to a network for routing a plurality of traffic demands from a respective source to a respective destination along one or more respective paths connecting the respective source to the respective destination. The network includes a plurality of routers, where each router is configured to receive a control message associated with each one of the plurality of traffic demands. The control message includes a total flow value of said each one of the traffic demands along said one or more respective paths. Each router is further configured to generate, based on the received control messages, an authorization message for each traffic demand, the authorization message indicating whether said each traffic demand is authorized to increase its total flow value. Each router is further configured to send the authorization message to the each traffic demand. A traffic demand is configured to increase a path flow value along a path from said one or more respective paths in response to receiving, from each router on the path, an authorization message indicating that the traffic demand is authorized to increase its total flow value.

Yet another aspect is directed to a method for allocating resources of a network among a plurality of traffic demands being routed from a respective source to a respective destination along one or more respective paths connecting the respective source to the respective destination. The method includes determining initial splits for each traffic demand over said one or more respective paths, where each split corresponds to one of the one or more respective paths; generating updated flow values for each traffic demand based on the determined splits; and computing updated splits based on the generated updated flow values.

BRIEF DESCRIPTION OF THE DRAWINGS

The accompanying drawings, which are incorporated in and constitute a part of this specification, illustrate an embodiment of the invention and, together with the description, explain the invention.

DETAILED DESCRIPTION

The following detailed description refers to the accompanying drawings. The detailed description does not limit the invention.

Overview

Implementations consistent with the principles of the invention relate to traffic engineering applications in networking systems. Systems and methods are provided for allocating resources of a network among a plurality of commodities to optimize fairness and network utilization.

System Description

Figure 1:
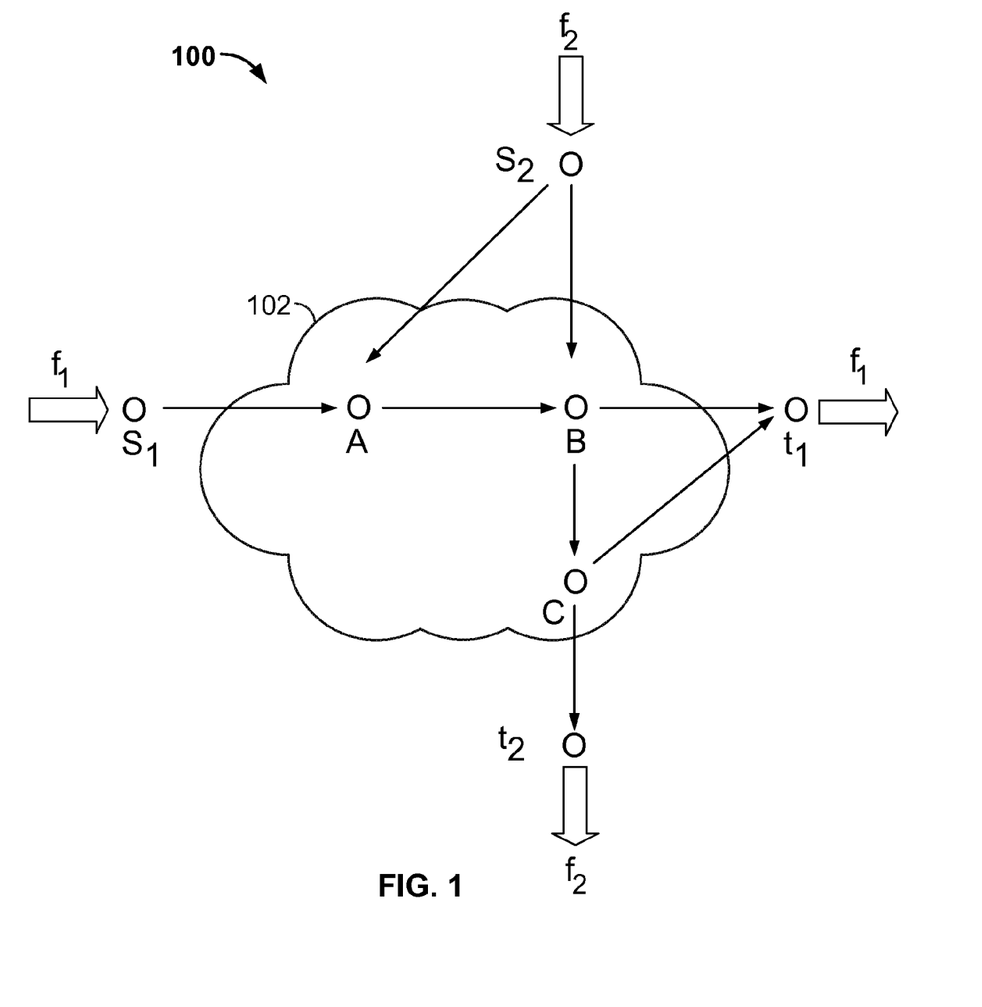
FIG. 1 is a diagram of an exemplary system in which concepts consistent with the principles of the invention may be implemented.

FIG. 1 is a diagram of an exemplary system 100 in which concepts consistent with the principles of the invention may be implemented. System 100 may allow multiple users to connect via a network 102. Network 102 may include any combination of network links, including, without limitation, digital subscriber lines, ISDN network links, Ethernet links, wireless links, fiber optic links, frame relay network links, asynchronous transfer mode (ATM) network links, or virtual private network (VPN) links. Network 102 may route information through a number of routers, such as routers A, B, and C.

System 100 also includes multiple edge nodes, such as source nodes $s_1$, $s_2$ and destination nodes $t_1$, and $t_2$, located at the edge of network 102. In some embodiments, the edge nodes may be implemented in receiver, transmitter, and/or transceiver circuitry capable to exchanging data with network 102.

Each one of the routers and edge nodes may include routing and processing circuitry for receiving and/or transmitting data. In one implementation, network 102 may be implemented as an Asynchronous Transfer Mode (ATM) network and each of routers A, B, and C and edge nodes $s_1$, $s_2$, $t_1$, and $t_2$ may be connected to one or more control nodes (not shown). These control nodes may correspond to Resource Management (RM) cells that provide feedback, e.g., to source nodes in response to fluctuations in available resources within the network. Two commodities and three routers are illustrated for simplicity. In practice, there may be more routers and/or connections.

A connection between a source node and a destination node (and the traffic demand associated with the connection) will be referred to herein as a commodity. In what follows, a commodity and a traffic demand associated with the traffic demand will be used interchangeably. In system 100, a first commodity i=1, representing a first traffic demand, is routed between a source node $s_1$ and a destination node $t_1$. The routing is done by transferring a commodity data flow $f_1$ through communication network 102 over one or more network paths p. A network path for a commodity between the source and destination nodes is defined by a set of nodes (the source-destination node pair and any intermediate nodes) interconnected by a set of links coupled to the nodes carrying the data flow of the commodity. Each link has a capacity corresponding to the traffic carried by the link. The capacity can be associated with bandwidth, effective bandwidth, link quality, or any suitable link characteristic. For simplicity of illustration, all links of system 100 are set to 1. This is exemplary and it should be appreciated that any capacity measure or value can be used.

The set of one or more network paths p that transport commodity 1 from $s_1$ to $t_1$ is denoted $P_1$. Set $P_1$ may include all simple paths connecting $s_1$ to $t_1$. In the example of FIG. 1, $P_1$ includes both paths $(s_1ABt_1)$ and $(s_1ABCt_1)$. This need not be the case, and $P_1$ can include any subset of the paths connecting $s_1$ and $t_1$. Commodity data flow $f_1$ can represented using a vector of individual path flow values associated with respective network paths in $P_1$ (i.e., $f_1=[f_1(p)|p \in P_1]$, where $f_1(p)$ is the path flow value for path p). Flow values may be measured as a unit of data transferred per unit of time. In one example, flow values may be measured using data rate units such as Mbits/second.

A total flow value of the commodity i=1 (or simply value of the commodity) is defined as the sum of the individual path flow values over all network paths p (i.e., $v(f_i)=\Sigma_{p \in P_i} f_i(p)$). In what follows, we will refer to a first commodity as larger than, smaller than, or equal to a second commodity if the total flow value of the first commodity is, respectively, larger than, smaller than, or equal to the value of the second commodity.

Similar to commodity i=1, a second commodity i=2 is routed between a source node $s_2$ and a destination node $t_2$ via a flow of data $f_2$ transferred over a set of paths $P_2=\{(s_2ABt_2)$ and $(s_2ABCt_2)\}$. A specific allocation of data flows for each of a plurality of commodities can be represented using a multicommodity flow F. Multicommodity flow F is a vector $(f_1, f_2, \ldots, f_k)$ of data flows $f_i$, $1 \leq i \leq k$, where k is the number of commodities to be routed through the network and $f_i$ is a data flow vector associated with commodity i.

Embodiments of this invention are based on a definition of fairness referred to as upward max-min fair (UMMF). According to this definition, an allocation (or multicommodity flow) is UMMF if the value of each commodity cannot be increased, along any of its paths, even if all strictly larger commodities are removed from the network. This means that, in a UMMF network, the allocation for a commodity cannot be increased subject to fixing the current flow routing of the smaller (and equal) commodities along their determined paths. In contrast, in max-min fairness, a commodity cannot be increased for any allocation that achieves the maximal values for the smaller or equal commodities. For example, if in a given network allocation, commodities that are smaller than or equal to the second largest commodity can be rerouted so that the value of second largest commodity is increased, then the flow cannot, by definition, be max-min fair. However, the flow may still be upward max-min fair. It is clear that any max-min fair multicommodity flow is also upward max-min fair multicommodity flow, but not vice versa. In the following description, the max-min fairness notion will be referred to as global max-min fair (GMMF) to better distinguish it from the UMMF notion.

Returning to the exemplary system of FIG. 1, it can be determined that the only GMMF flow in network 102 is the one which transports one flow unit on path ($s_1ABt_1$) for commodity 1 and one flow unit on path ($s_2ABt_2$) for commodity 2. On the other hand, there are many different UMMF flows. In fact, for every a between 0 and 0.5, if flow i routes α flow units on ($s_iABCt_i$) and 1-2α flow units on the other path, then the resulting network allocation is UMMF. This holds since the flow is maximal (no flow on a single path can be increased) and both commodities have the same flow value.

Exemplary Processes for Determining a UMMF Allocation

Figure 2:
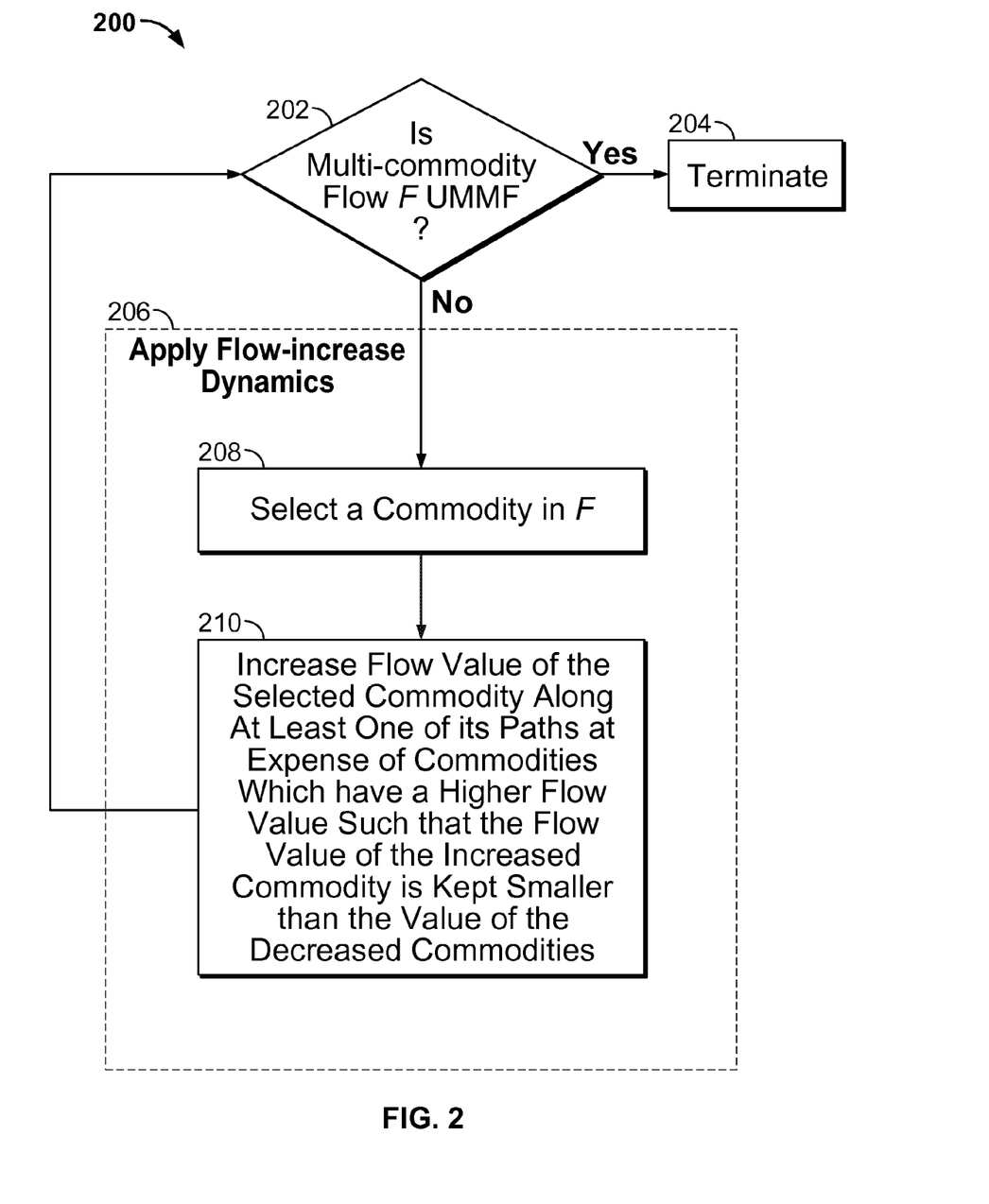
FIG. 2 is a flow chart illustrating an exemplary process for determining a fair allocation according to some embodiments of the invention.

FIG. 2 is a flow chart illustrating an exemplary process 200 for determining a UMMF allocation according to some embodiments of the invention. Process 200 may be implemented in one or more components of a network communications system (e.g., system 100 of FIG. 1). This can be done in a distributed way, e.g., using routing and processing circuitry of various edge nodes and routers. Alternatively, this can be done in a distributed way, e.g., using routing and processing circuitry of control nodes in connection with the various edge nodes and routers.

At 202, it is determined whether a multicommodity flow F, i.e., flow values associated with a plurality of commodities (or traffic demands) over a plurality of respective network paths, is UMMF. This may be done by checking whether the value of each commodity (i.e., traffic demand) cannot be increased, along any of its paths, even if all strictly larger commodities are removed from the network.

If the multicommodity flow is determined to be UMMF, then process 200 may be terminated (at 204). Otherwise, multicommodity flow F (at 206) may be updated subject to flow-increase dynamics, as described in 208 and 210 below.

At 208, one commodity is selected from the commodities associated with multicommodity flow F. This commodity may be selected randomly from the set of k commodities, or commodities may be selected in a round robin fashion from the set of k commodities.

At 210, the value of the selected commodity is increased along at least one of its paths at the expense of values of larger commodities. For example, the value of the selected commodity is increased by increasing one or more path flow values along one or more paths of the selected commodity. This may be done while decreasing the value of commodities which have a value higher than that of the selected commodity, along the same paths. The increase of the selected commodity and decrease of the larger commodities may be done simultaneously. Alternatively, the increase of the selected commodity and decrease of the larger commodities may be done sequentially, which may simplify implementation. The increase is performed such that the total flow value of the increased commodity is kept smaller than (i.e., upper bounded by) the total flow value of the decreased commodities. This condition, which controls how the value of the selected commodity is increased, will be referred to as a flow-increase dynamic.

After applying the flow-increase dynamic of 206, the UMMF test of 202 is checked again. The process is terminated if the multicommodity flow is UMMF, and otherwise, another commodity may be increased using the flow-increase dynamics of 206.

In some implementations, process 200 may be implemented in a centralized way. For example, the increasing of the selected commodity and decreasing of the larger commodities may be performed by processing circuitry in network control devices (such as network management devices or RM cells in an ATM network). The network control devices may communicate with devices associated with the traffic demands such as receivers, transmitters, transceiver, routers, and/or switching devices. In some implementations, process 200 may be implemented in a decentralized way. For example, processing circuitry associated with each traffic demand device may determine the amount of the increase or decrease and adapt the traffic flow accordingly. The processing circuitry for performing process 200 may be integrated in circuitry of the routing devices or may be implemented in a separate circuit therefrom.

Figure 3:
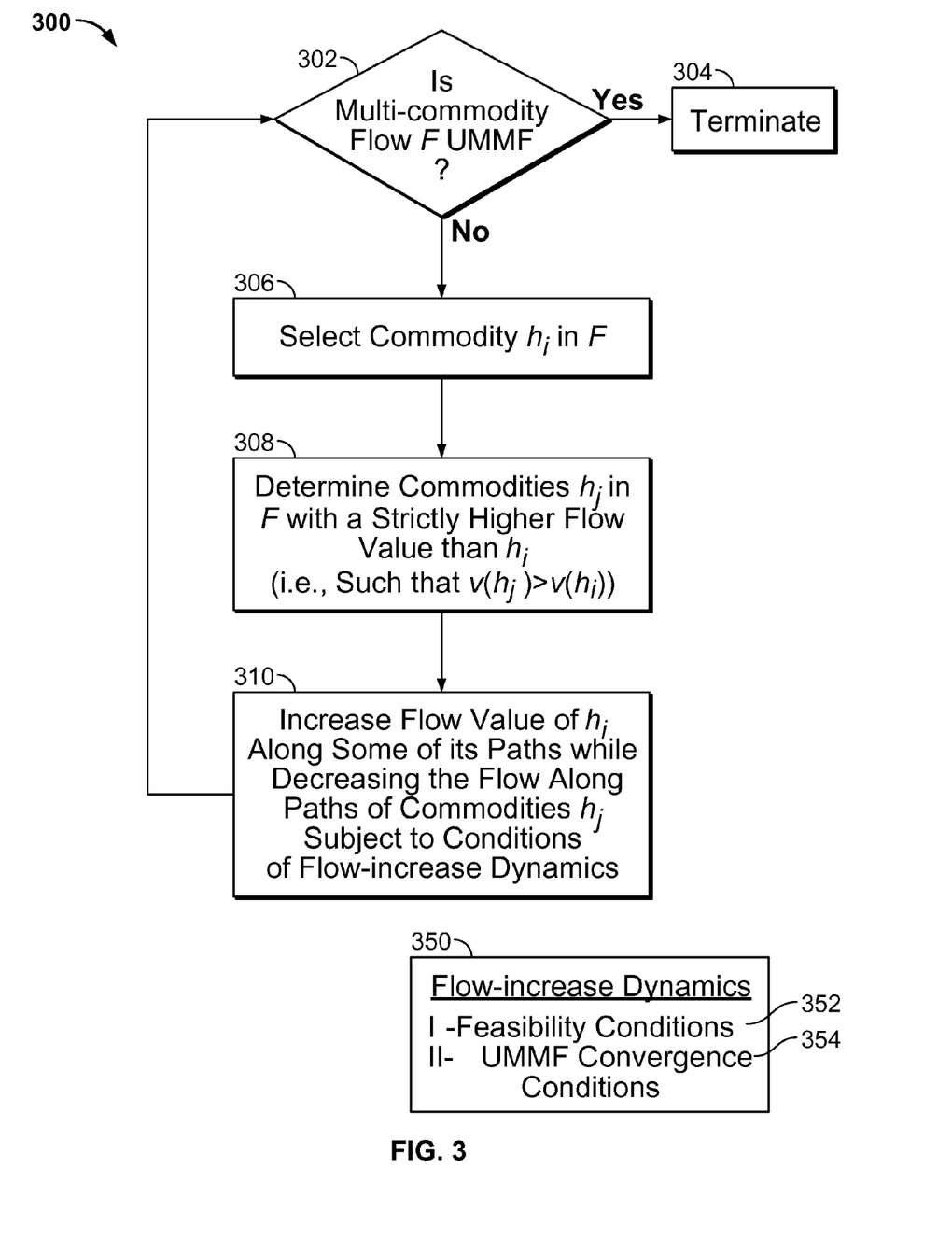
FIG. 3 is a flow chart illustrating an exemplary process for determining a fair allocation based on flow-increase dynamics.

FIG. 3 is a flow chart illustrating an exemplary process 300 for determining a UMMF allocation based on flow-increase dynamics. Process 300 may correspond to one embodiment of process 200 of FIG. 2 and may be implemented similarly.

At 302, a multicommodity flow F is checked to determine whether it is UMMF. This may be done similarly to 202 in FIG. 2. If the multicommodity flow F is UMMF, then process 300 may be terminated at 304. Otherwise, a commodity $h_i$ is selected from the k commodities associated with the multicommodity flow F at 306. This may be done similarly to 208 in FIG. 2.

At 308, one or more commodities $h_j$ are determined from the k commodities associated with multicommodity flow F based on the selected commodity $h_i$. Each one of the determined commodities $h_j$ is identified such that it has a total flow value that is strictly higher than the total flow value of $h_i$. In other words, commodities $h_j$ are determined such that $v(f_j) > v(f_i)$.

At 310, the flow value $v(h_i)$ of commodity $h_i$ is increased, along some of the paths of $h_i$, while decreasing the flow value or values of the one or more determined commodities $h_j$. Because the paths are fixed, the increase and decrease are performed along the same path or paths.

The increase at 310 is done subject to conditions which we be referred to as flow-increase dynamics 350. Flow-increase dynamics 350 may include feasibility conditions 352, to ensure that the flow values are increased in a way that meets the capacity constraints of the network. Such feasibility conditions may include:

1. For every path p of commodity $h_i$, the path flow value of $h_i$ along p does not decrease, and for every path p of each commodity $h_j$, the path flow value of $h_j$ along p does not increase.
2. The decreased total flow value of the commodity $h_j$ is greater than or equal to the increased total flow value of each commodity $h_i$.
3. If the total flow value of commodity $h_i$ is increased by an amount Δ, then the total flow value of commodity $h_j$ is decreased by at most a multiple of Δ.

Flow-increase dynamics 350 may also include convergence conditions 354, to ensure that flows are increased in way to approach or converge to a UMMF allocation. Such convergence conditions may include:

1. If the value of a given commodity can be increased while changing the values of only larger commodities, then in a finite number of steps, the value of the given commodity will either be increased or it will not be possible to increase it.
2. When the value of a commodity is increased, it is increased by at least a constant fraction of a maximum possible increase associated with the increase (subject to other conditions of the dynamics).

The above conditions are exemplary and it should be understood that other conditions may be added or some conditions relaxed or modified as appropriate.

Figure 4:
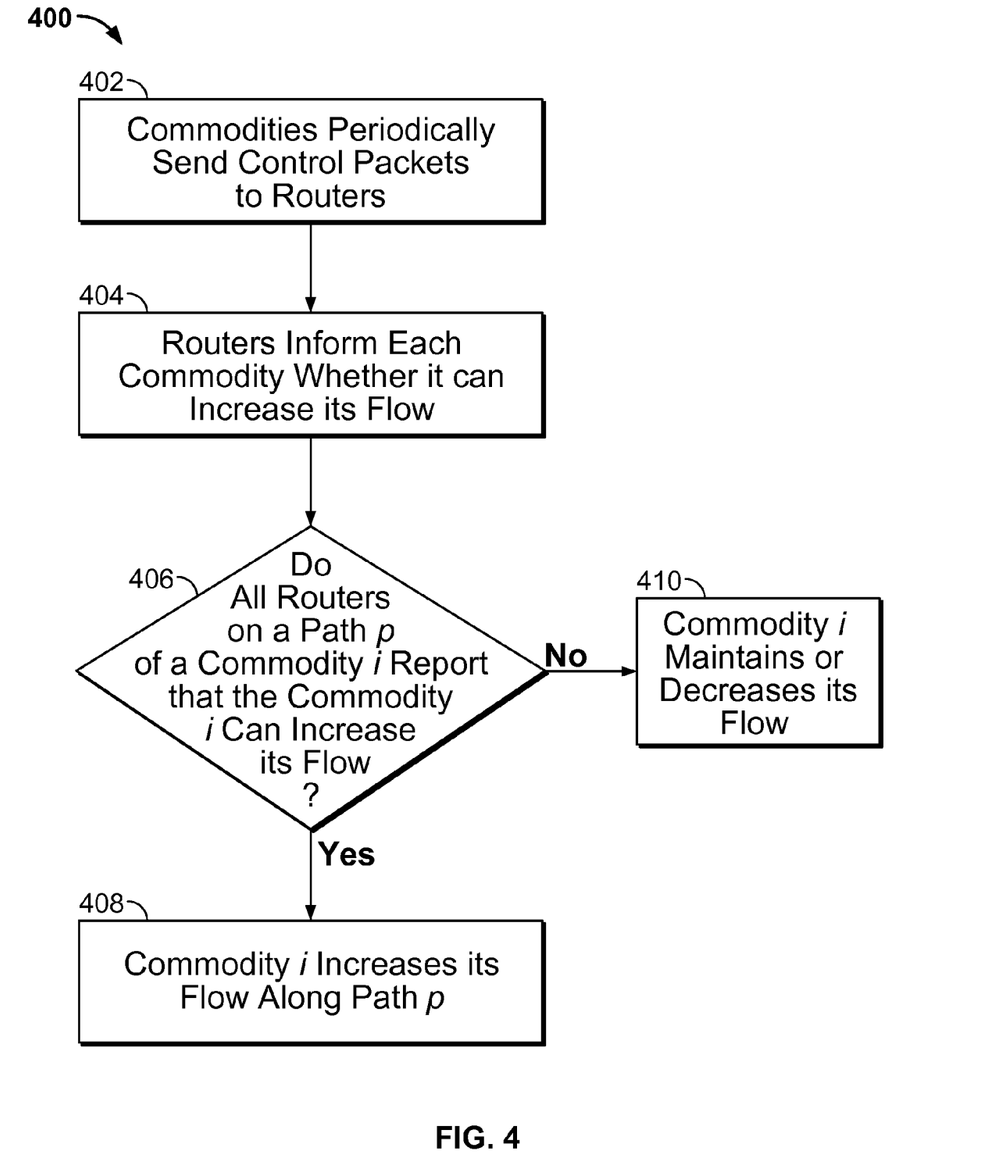
FIG. 4 is a flow chart illustrating exemplary operations of a network for routing a plurality of commodities, according to some embodiments.

The flow-increase dynamics discussed above may be easily implemented distributively and asynchronously, as shown in FIG. 4. FIG. 4 is a flow chart illustrating exemplary operations of a network (such as network 102 of FIG. 1) for routing a plurality of commodities, according to some embodiments.

At 402, control messages associated with each one of a plurality of commodities in a network (e.g., network 102 of FIG. 1) are periodically sent to each router B of a plurality of routers in the network (e.g., routers A, B, and C of FIG. 1). Any appropriate time period may be chosen. For example, messages may be sent once every few tens of seconds. The control messages include information about the total flow value of the corresponding commodity. In some embodiments, the control message may be control packets generated by processing circuitry associated with the source node and/or destination node of the commodity.

At 404, each router B may inform each commodity whether the commodity can increase its total flow value based on the received control messages. For example, router B may compare the total flow values reported in the received control messages for the commodities routing flows through router B to find the maximum total flow value among those commodities sharing router B. This may be done using logic circuitry in router B. Based on the comparison, router B may identify which commodities, from the commodities sharing router B, has a total flow value that is less than the maximum total flow value. Router B may send an authorization message to each such identified commodity that routes less than the maximum total flow value. The authorization message may indicate that the commodity is permitted to increase its total flow value. In this way, the authorization message from each router B to a commodity $h_i$ is based not only on the path flow value of $h_i$ along a path p that passes through B, but is also based on the flow values of the commodity along other paths of commodity $h_i$.

At 406, it is determined whether a commodity $h_i$ has a path p on which all routers report that $h_i$ is authorized to increase its total flow value. This determination may be made using routing circuitry associated with commodity $h_i$, e.g., circuitry of devices corresponding to the source node and/or destination node of the commodity. In response to determining that such a path p exists, commodity $h_i$ increases its path flow value along path p (at 408). Alternatively, commodity $h_i$ may decrease or maintain its total flow value (at 410). In some implementations, commodity $h_i$ may decrease its flow value in response to receiving control messages from the routers instructing the commodity to decrease its flow value. For example, a router may instruct a commodity $h_i$ to decrease its path flow value along a path p that passes through router B. Commodity $h_i$ may also decrease its flow value in response to periodically checking what allowable amount it is permitted to send along each path.

Iterative Exhaustive Waterfill (IEWF) Algorithm

Figure 5:
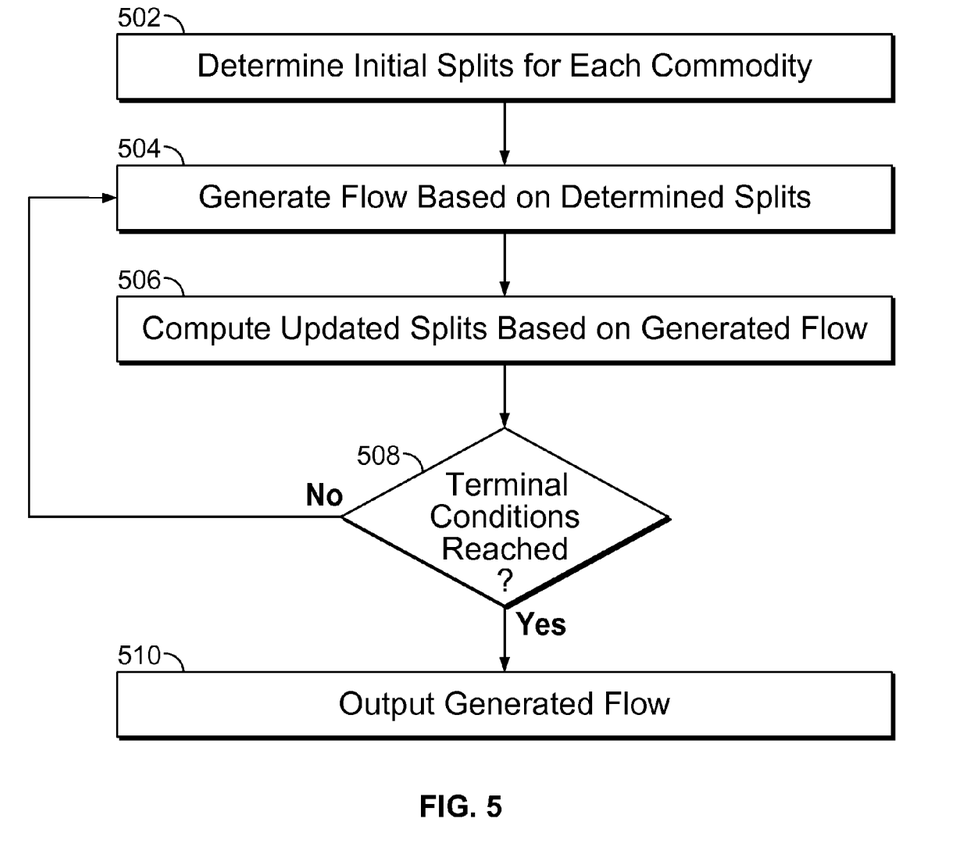
FIG. 5 is a flow chart illustrating an exemplary process for determining a fair allocation.

An exemplary process for finding a UMMF allocation is described in FIGS. 5 and 6 below, and its performance analyzed in FIG. 7 below. FIG. 5 is a flow chart illustrating an exemplary process 500 called Iterative Exhaustive WaterFill (IEWF) algorithm for determining a UMMF allocation. Process 500 is an embodiment of process 200 of FIG. 2 and may be implemented similarly.

Each commodity i of a plurality of commodities in a network maintains a distribution $\{\lambda(p)|p \in P_i\}$ over its paths p. The fractions $\{\lambda(p)|p \in P_i\}$ sum to one and are called splits of commodity i. These splits are updated in each iteration of the IEWF algorithm until the best splits are determined, as described below.

At 502, initial splits are determined for each commodity using a split initialization method.

In some embodiments, the split initialization method may be independent of network path characteristics. For example, splits may be uniformly assigned by assigning to each path of a commodity a split equal to 1/(#paths), where #paths denotes the total number of paths for the commodity. This will be referred to as a uniform split initialization method. Another split initialization method that is independent of network path characteristics assigns the splits randomly and will be referred to herein as a random split initialization method. In this method, the splits may be computed proportionally to a set of random numbers.

Alternatively, split initialization methods may take into account path characteristics. For example, split initialization methods may route more flow along shorter paths using decaying splits. For example, a decaying split initialization method may use splits proportional to $1/10^l$, where l is the number of nodes in the path. In this method, paths with fewer nodes are given a greater split, but all paths with the same node count are assigned the same split. This method will be referred to as len exponential decay. A second decaying split initialization method adds a tie breaking component to paths with equal nodes. For example, for each commodity, the paths may be sorted from shortest to longest based on node count. If two or more paths have the same number of nodes, they are arbitrarily numbered or ranked. Letting x be the rank of a path p among all paths of a commodity, the split given to this path is proportional to $1/10^x$. This method, called exponential decay, ensures that no two paths belonging to the same commodity have the same splits.

At 504, flow values of commodities are increased based on the determined splits in order to generate a new multicommodity flow. This is done using an iteration of process 500, called an Exhaustive WaterFill (EWF) iteration, as explained in further detail in FIG. 6 below.

At 506, new splits are computed based on the flow generated at 504. For example, letting $f_i(p)$ be the flow of commodity i along path $p \in P_i$ at the end of the EWF iteration of 504, then $\lambda(p)$ may be scaled by the total flow value of commodity i (i.e., $\lambda(p)$ is set to $f_i(p)/v(f_i)$).

At 508, termination conditions are checked. For example, if the process is determined to have converged (e.g., fixed point splits are reached) and/or if a number of iterations has been performed, process 500 may be terminated and the flow last generated at 504 is output at 510. Any suitable termination condition may be used. Alternatively, the updated splits are used to run another EWF iteration at 504.

Figure 6:
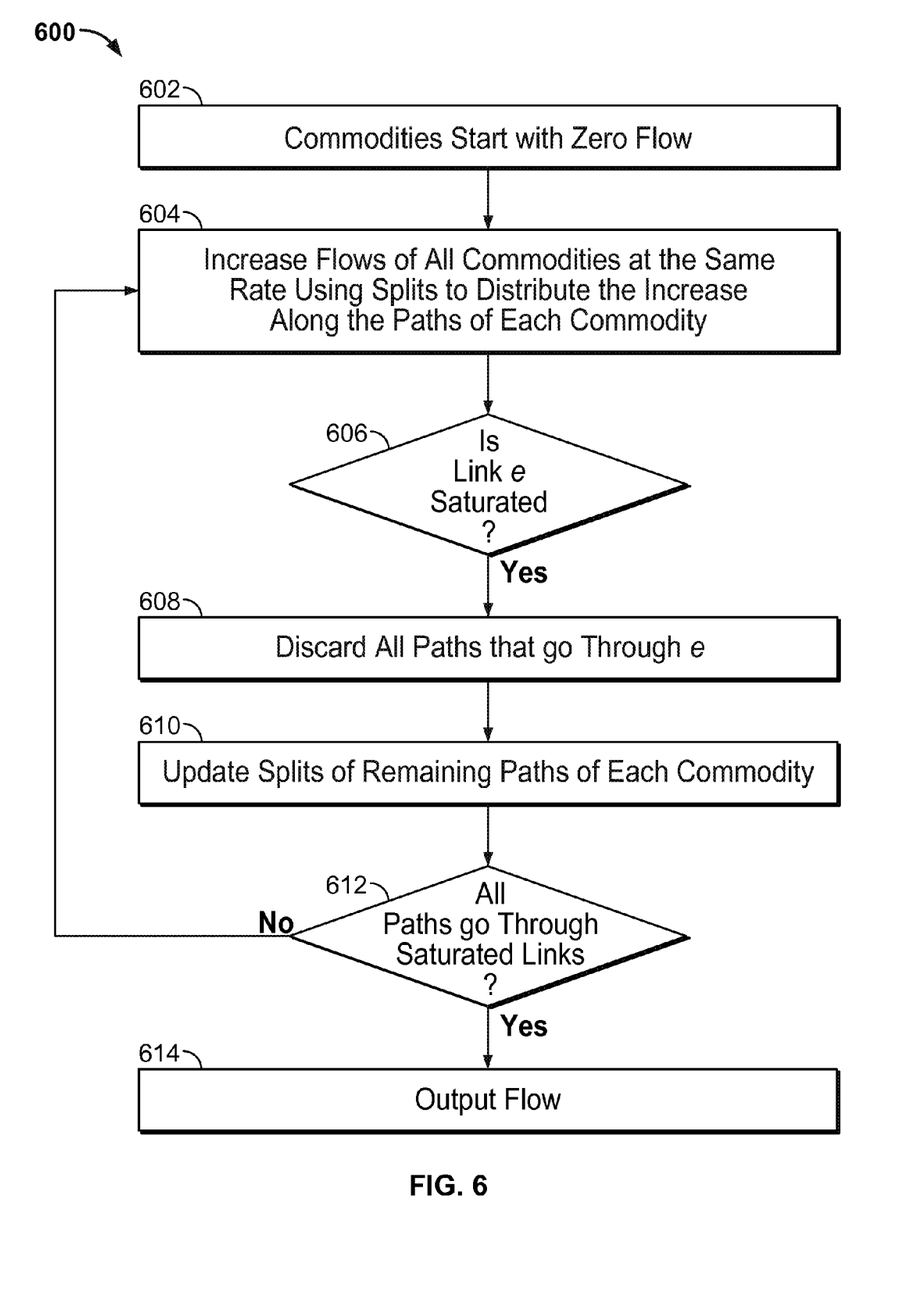
FIG. 6 is a flow chart illustrating an exemplary iteration of the process of FIG. 5.

FIG. 6 is a flow chart illustrating an exemplary EWF iteration 600 of the IEWF process of FIG. 5. Process 600 takes as input splits for each commodity and output a multicommodity flow based on the input splits. As defined above, these splits are fractions, one per path, that sum to one.

At 602, flow values of commodities are initialized to zero. At 604, the flow values of all commodities are increased simultaneously at the same rate. For each commodity, the increase is divided proportionally to the splits determined for that commodity. In other words, to increase a commodity i by 1 unit, the path flow value along each path p is increased by $\lambda(p)$.

When a link e is saturated (at 606), then all paths that include link e are discarded at 608 and the splits associated with the discarded paths are set to zero.

At 610, splits are updated based on the number of paths remaining (i.e., non-saturated paths) for each commodity. For example, if all non-saturated paths have zero splits, then the splits are changed to be equal and sum to one. This is done by setting each split to 1/#UnSat, where #UnSat is the number of the non-saturated paths. Alternatively, if there is at least one non-saturated path with a non-zero split, then the splits of the non-saturated paths are re-scaled so they sum to 1. This is done by updating the split $\lambda(p)$ of a non-saturated path p of commodity i $\lambda(p)/\Sigma_{p \in Pi \cap UnSat} \lambda(p)$), where UnSat is the set of the non-saturated paths for commodity i.

The process thus continues, i.e., the flow values of the commodities are further increased at 604 and the splits are further updated at 608 until all paths of all commodities are saturated. This saturation condition may be determined when each one of the paths include a saturated link (at 612). In response to this determination, the generated multicommodity flow, (corresponding to the flow values $f_i(p)$ for each commodity i along one of its path $p \in P_i$) is output at 614.

Experimental Results

FIGS. 7A, 7B, 7C, and 7D are graphs showing experimental results from running an IEWF process, such as process 500 of FIG. 5. In these graphs, the behavior of the IEWF is analyzed on two types of networks: a metro level abstraction of an exemplary backbone network and a set of synthetic networks generated using the Waxman models in varying sizes. Description of the Waxman models can be found in B. M. Waxman, Routing of multipoint connections, *IEEE Journal on Selected Areas in Communication*, 6 (9):1617-1622, 1988. Specifically, for the exemplary backbone network, a subset of the largest demands in the backbone network was selected as an experimental commodity set. For the Waxman graphs, 20 graphs were generated with 20, 30, 40, 50, 60 and 70 nodes and parameters of alpha=0.55 and beta=0.55. These parameters generate graphs with an average degree of about 0.3 n, where n is the number of nodes. For each size, graphs were repetitively generated, discarding graphs which are not two-connected, until 20 two-connected graphs were obtained. To generate the commodities for the Waxman graphs, the nodes were randomly split into three sets; one of the sets was selected as source nodes and the other as destination nodes. A commodity was defined from each of the source nodes to each of the destination nodes. Overall, there were about $(n/3)^2$ commodities for each graph. As explained in the background section above, the global max-min allocation (GMMF) can be computed by iterative deployment of a linear program. This algorithm was implemented to generate the GMMF solution flows in order to evaluate the behavior of IEWF relative to the GMMF solution.

Figure 7A:
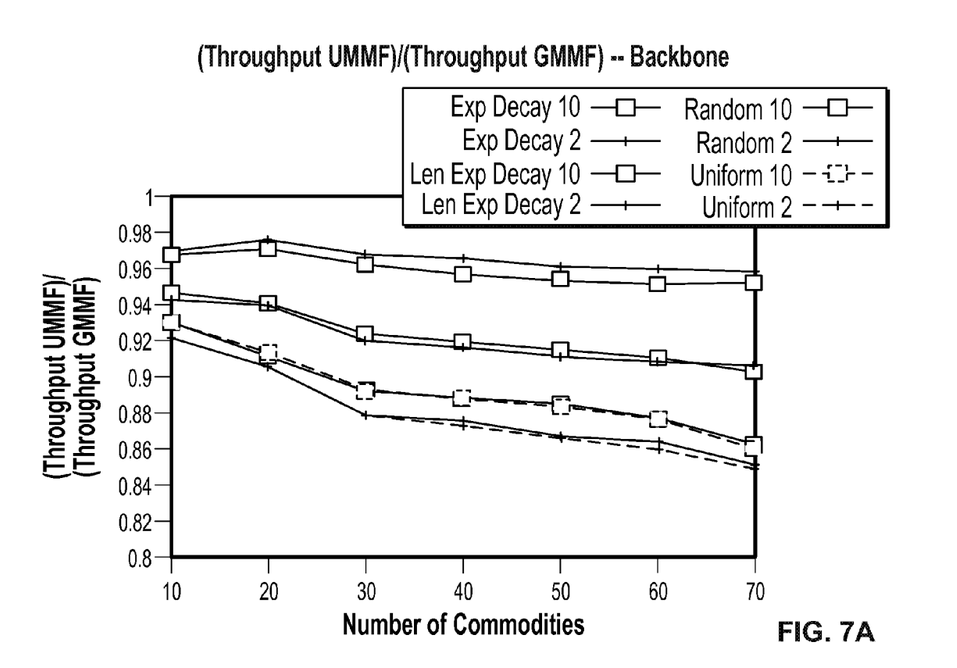
FIGS. 7A, 7B, 7C, and 7D (which will be referred to collectively as FIG. 7 below) show experimental results for the processes of FIGS. 5 and 6.

FIG. 7A illustrates the behavior of IEWF based on the four different split initialization methods set forth above: exponential delay, len exponential delay, random, and uniform. FIG. 7A shows a ratio between (i) the total throughput obtained by the IEWF algorithm with each split initialization method for two and ten iterations, and (ii) the total throughput obtained by the GMMF solution for the same input. Each point in the graph is the average of 50 runs, each having a random subset of commodities. The x-axis represents the number of commodities in the random subset, and the y-axis represents the average total throughput ratio.

A comparison between the illustrated ratios shows that the split initialization methods that take into account the length of the paths (the exponential decay and len exponential decay methods) achieve a higher overall throughput in this example than the approaches that are insensitive to path length (the uniform and random methods). This is because the exponential decay and len exponential decay methods use fewer nodes and prefer shorter paths. This results in a less congested network. Therefore, the decaying exponential methods can route more traffic. The highest throughput is achieved with the exponential decay split initialization method. The reason is that this method prefers exactly one path per commodity and routes significant amounts of traffic on each path only when all the shorter paths for this commodity are fully saturated. In other words, the network is less congested in this scenario as paths get saturated one by one, leaving larger parts of the network free or unsaturated.

For each one of the four methods, two graphs, corresponding to 2 iterations and 10 iterations, are shown. The difference between these graphs is in the achieved fairness between commodities. A run of 10 iterations is able to better balance commodities that have the same flow in GMMF. Specifically, commodities that have the same flow value in a GMMF solution would typically have closer flow values after 10 iterations than after 2 iterations. Furthermore, the gain in the throughput of the run of 2 iterations, compared to the run of 10 iterations, with the exponential decay methods, is mainly due to very few high flow commodities. This method has a faster convergence rate in this example.

Figure 7B:
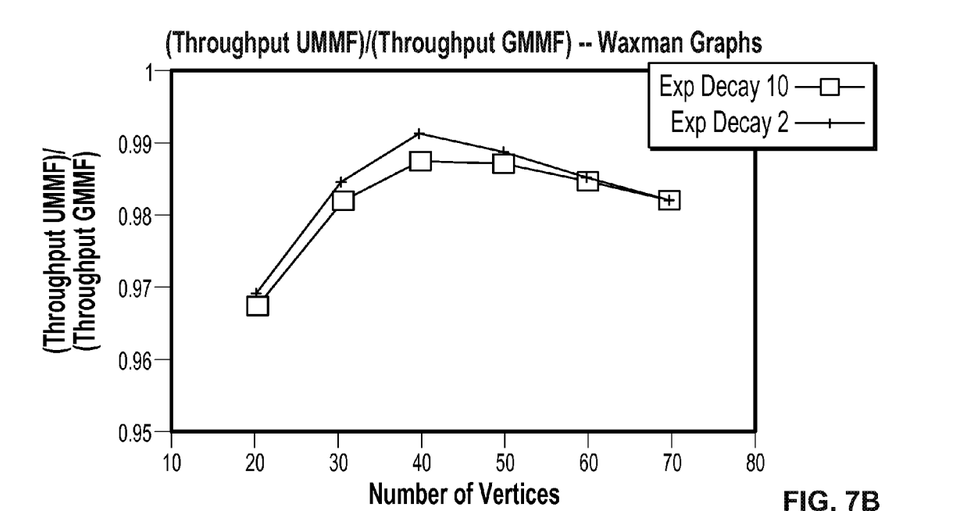

FIG. 7B illustrates the behavior of the exponential decay split initialization method with 2 and 10 iterations on the family of Waxman graphs. The x-axis represents the number of nodes in the graph and the y-axis is the average of the UMMF throughput divided by the GMMF throughput on all the graphs tested. On these graphs, the UMMF solution reached at least 96% of the GMMF solution's throughput.

Figure 7C:
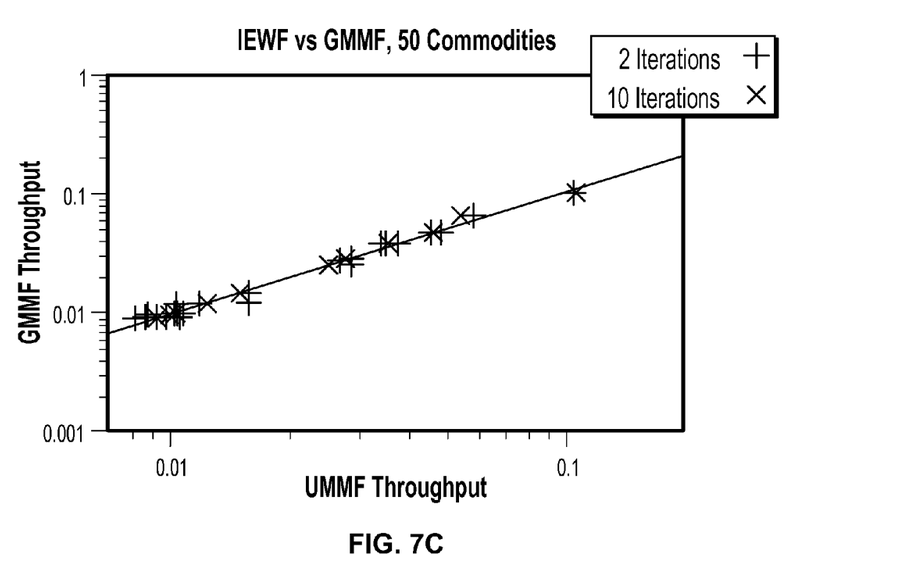

FIG. 7C shows a comparison of the flow values per commodity from a random set of 50 commodities in the exemplary backbone network. Each point in the graph represents one commodity out of the set of experimental commodity set described above. The x-axis represents the ratio between (i) the throughput allocated to that commodity in the IEWF solution (with either 2 or 10 iterations) and (ii) the total throughput in the GMMF solution. The y-axis represents the ratio between (i) the throughput allocated to the same commodity in the GMMF solution found by the LP based algorithm and (ii) the total throughput in the GMMF solution. The points along the diagonal represent commodities that are assigned the same throughput both in the GMMF solution and in the IEWF solution, points below the diagonal represent commodities with a bigger share in the IEWF solution, while points above the diagonal represent commodities with a bigger share in the GMMF solution.

FIG. 7C shows that in the practical scenarios considered, the results of GMMF and UMMF are close, and there is no significant gap in fairness. Running 10 iterations usually outperforms 2 iterations in terms of fairness.

Figure 7D:
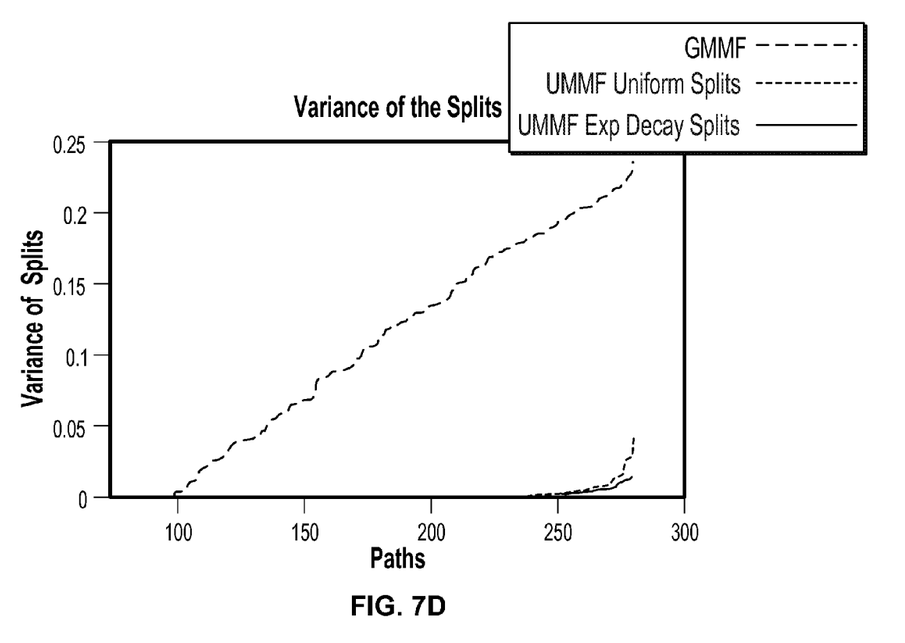

FIG. 7D illustrates the variance of allocations using the IEWF and GMMF approaches on the exemplary backbone network. This looks at the stability of the IEWF and GMMF approaches to measure how sensitive the resulting multicommodity flow is in response to a small change in the demands. In real systems, demands vary over time (usually in a rather smooth manner), which leads to changes in the Traffic Engineering (TE) solution deployed in the network. An important property of any TE algorithm is stability when reacting to these changes, as deploying new splits or paths to the network may be time consuming and can have undesirable effects like out of order arrival of TCP packets causing re-transmits.

In the experiment of FIG. 7D, the GMMF, the IEWF with uniform splits, and IEWF with exponential delay splits were run on the exemplary backbone network with a set of 50 different but similar sets of traffic demands. For each commodity and path, the splits of the path were collected from all the experiments in which the commodity participated, and the variance of the splits was computed. The top line in FIG. 7D represents a histogram of the splits' variance in the GMMF solution and the other two lines represent a histogram of the splits' variances in the IEWF runs. The variances of the splits generated by the IEWF runs were significantly lower than the variance in the GMMF solution. This means that a small change in the demand set led to a big change in the GMMF solution, while the IEWF solution (with either type of splits) was more stable than the GMMF solution.

As can be seen from the graphs of FIG. 7, the IEWF algorithm achieves results that are comparable to the GMMF LP algorithm both in fairness and in network utilization. However, the IEWF can be implemented more efficiently and robustly than to the GMMF LP algorithm. Unlike the GMMF LP algorithm, the IEWF can be implemented distributively and asynchronously.

Systems and methods are provided for allocating resources of a network among a plurality of commodities to optimize fairness and network utilization. Methods based on flow-increase dynamics converge toward an upward max-min fair (UMMF) allocation, in which the value of each commodity (e.g., traffic demand) cannot be increased, along any of its paths, even if larger commodities are removed from the network. An efficient iterative algorithm that converges to a UMMF solution is also provided. The described methods and systems can be implemented efficiently, distributively, and asynchronously.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while series of steps have been described with regard to FIGS. 2-6, the order of the steps may be varied in other implementations consistent with the invention. Moreover, non-dependent steps may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or a "component" that performs one or more functions. This logic may include hardware, such as an application specific integrated circuit or a field programmable gate array, software, or a combination of hardware and software.

No element, step, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for allocating resources of a network among a plurality of traffic demands, the method comprising:

selecting a first traffic demand from the plurality of traffic demands, wherein the first traffic demand has a first total flow value along one or more first paths in the network;

identifying, from the plurality of traffic demands, a second traffic demand having a second total flow value along one or more second paths in the network, wherein the second total flow value is higher than the first total flow value;

iteratively increasing, using routing circuitry associated with the first traffic demand, the first total flow value of the first traffic demand by an amount $\Delta$ along at least one of said one or more first paths until a convergence condition is met, the convergence condition being that the first and second total flow values converge to an upward max-min fair (UMMF) allocation where a total flow value of each traffic demand cannot increase, along any of its paths, even if traffic demands with a flow value strictly larger than the total flow value are removed and the amount $\Delta$ is constant across iterations and a fraction of a possible maximum increase; and decreasing, using routing circuitry associated with the second traffic demand, the second total flow value of the second traffic demand along at least one of said one or more second paths, wherein the increased first total flow value of the first traffic demand is upper bounded by the decreased second total flow value of the second traffic demand.

2. The method of claim 1, wherein the increasing and the decreasing are performed subject to a feasibility condition.

3. The method of claim 2, wherein the feasibility condition requires that a path flow value of the first traffic demand for every path along the one or more first paths does not decrease, and a path flow value of the second traffic demand for every path of the one or more second paths does not increase.

4. The method of claim 2, wherein:
the feasibility condition requires that decreasing the second total flow value of the second traffic demand is at most a multiple of $\Delta$.

5. A network for routing a plurality of traffic demands from a respective source to a respective destination along one or more respective paths connecting the respective source to the respective destination, the network comprising a plurality of routers, wherein each router is configured to:

receive a control message associated with each one of the plurality of traffic demands, wherein the control message includes a total flow value of said each one of the traffic demands along said one or more respective paths;

iteratively generate, based on the control message, an authorization message for each traffic demand, the authorization message indicating whether said each traffic demand is authorized to increase its total flow value by an amount $\Delta$, wherein said each traffic demand is authorized to increase its total flow value until a convergence condition is met, the convergence condition being that the total flow values of each one of the plurality of traffic demands converges to an to an upward max-min fair (UMMF) allocation where the total flow value of each traffic demand cannot increase, along any of its paths, even if traffic demands with a flow value strictly larger than the total flow value are removed and that the amount $\Delta$ is constant across iterations and a fraction of a possible maximum increase; and send the authorization message to the each traffic demand, wherein a traffic demand is configured to increase a path flow value along a path from said one or more respective paths in response to receiving, from each router on the path, an authorization message indicating that the traffic demand is authorized to increase its total flow value.

6. The network of claim 5, wherein each router is further configured to:
determine a maximum total flow value among traffic demands being routed through the router;
identify a traffic demand from the traffic demands being routed through the router, wherein the identified traffic demand has a total flow value that is less than the maximum total flow value;
in response to identifying, generate the authorization message for the identified traffic demand.

7. The network of claim 5, wherein each router is further configured to:
send a control message instructing a traffic demand to decrease its total flow value, wherein a traffic demand decreases its total flow value in response to receiving the control message.

8. The network of claim 5, wherein
a maximum allowable flow value along each one of said one or more respective paths is periodically checked for the each traffic demand; and
a path flow value for the each traffic demand is decreased in response to the checking.

* * * * *